3,592,818
PROCESS FOR THE PRODUCTION OF ALPHA-PICOLINE AND BETA-PICOLINE IN VAPOR PHASE WITH CATALYSTS BASED ON SILICA MAGNESIA
Jean Herzenberg, Milan, Giorgio Boccato, Venice, and Marcello Pieroni, Milan, Italy, assignors to Montecatini Edison S.p.A., Milan, Italy
No Drawing. Filed June 28, 1967, Ser. No. 649,447
Claims priority, application Italy, July 1, 1966, 15,162/66
Int. Cl. C07d *31/08*
U.S. Cl. 260—290            6 Claims

ABSTRACT OF THE DISCLOSURE

A process is provided for the preparation of mixtures of alpha-picoline and gamma-picoline comprising the reaction of ammonia and acetaldehyde or paraldehyde in the vapor phase at a temperature of from 200° C. to 650° C. in the presence of
 (a) a catalyst comprised of a mixture of silica and magnesia; and
 (b) a cadmium fluoride co-catalyst the amount of the magnesia of said catalyst being from 10% to 60% by weight.

BACKGROUND OF THE INVENTION

This invention relates to a process for the synthesis of alpha-picoline and gamma-picoline through the reaction of acetaldehyde and/or paraldehyde and ammonia in vapor phase in the presence of a catalyst based on silica and magnesia.

The process so far known in the art for producing alpha and gamma-picoline starting from aldehydes and ammonia require catalysts based on silica-alumina or silica-alumina containing promoters as salts or oxides of metals such as, for example, Th, Zn, Cd, Sn, Pb, Fe, Ni etc.

By operating in the presence of silica-alumina only, yields in gamma-picoline higher or nearly equal to the yields of alpha-picoline are obtained.

By adding the above mentioned promoters to the silica-alumina, it is possible to improve the total picoline yield and to slightly increase the quantity of alpha-picoline with respect to the quantity of gamma-picoline. In the latter case the alpha-picoline yield is nearly equal to or slightly higher than the yields in gamma-picoline.

No process, allowing one to obtain very good yields of alpha-picoline and gamma-picoline while keeping their ratio remarkably disposed towards the formation of prevailing alpha-picoline quantities, is known to date.

Such a process would be of very great interest, in consequence of the higher industrial importance of alpha-picoline compared with the importance of gamma-picoline. Gamma picoline is in fact almost exclusively used for producing pharmaceutics deriving from isonicotinic acid. Alpha-picoline is, on the contrary, widely used as an intermediate product for several industrial appliances, among which there may be mentioned the synthesis of alpha-vinyl pyridine used in the field of rubber and synthetic fibres as well as for producing coccidiostatics, bactericides, weed killers, antidotes etc., of broad use.

Accordingly an object of this invention is that of providing a process which provides high yields in alpha and gamma-picoline, while permitting one to attain quantities of alpha-picoline higher than of gamma-picoline.

A further object of this invention is that of providing a process that employs a catalyst exhibiting high activity, which catalyst is easy to recover and regenerate.

THE INVENTION

The process according to this invention comprises reacting acetaldehyde and/or paraldehyde and ammonia in vapour phase in the presence of a catalyst.

The catalyst according to this invention consists of a mixture of silica and magnesia, occasionally in the presence of one or more promoters chosen among metals or metal compounds belonging to Group II and IV of the periodic table.

The silica-magnesia mixture—obtainable both through coprecipitation and mixing of the gels of the two components has a MgO content ranging from 10% to 60% by weight, preferably between 20% and 35%.

It has been found that a yield of alpha-picoline higher than the yield of gamma-picoline is surprisingly achieved by using a silica-magnesia mixture as a catalyst for the synthesis of alpha and gamma-picoline.

It has been, moreover, found that the addition of promoters chosen among metals or metal compounds belonging to Group II and IV of the Periodic System remarkably and unexpectedly increases the activity of the silica-magnesia mixture improving its selectivity as to the forming of alpha-picoline.

Small amounts of these promoters, added to silica-magnesia already give good technical yields, as proved by the comparative tests carried out by using $CdF_2$ as activator in an amount of 2% by weight.

On the other hand, the use of a high initiator percentage as for example 20% by weight—introduces a relatively small increase in the yield of alpha and gamma picoline, such to in no wise justify the use of a very high initiator percentage, for economical reasons.

The addition of promoters to silica-magnesia can be carried out according to various techniques, for example through impregnation or reaction "in situ," or thermal decomposition of products previously deposited on the catalyst surface.

Usually the catalyst is activated before use by heating carried out for some hours at temperatures up to 600° C., in the presence of air.

Good results were achieved by using silica-magnesia of commercial type with a MgO content of 28% by weight, an oxide or halide of Cd, Zn or Pb having been deposited thereon.

The catalysts according to this invention can be used both in fixed and fluidizing bed. Owing to technical reasons it is, however, preferable to operate with the catalyst arranged in fluidized bed.

The process according to the present invention is carried out at a temperature comprised between 200° C. and 650° C. The best results are, however, achieved by operating at a temperature between 300° C. and 550° C.: this temperature range is therefore preferential.

The molar ratio acetaldehyde/ammonia generally ranges between 1:0.33—according to the theoretical ratio required for the reaction and—1:5. In view of economical reasons it is, however, preferable to operate with a molar ratio ranging between 1:0.5 and 1:3.

The process according to this invention is commonly carried out at atmospheric pressure, but slight superatmospheric pressures afford operational advantage.

In lieu of acetaldehyde, use can be made of an acetaldehyde polymer which depolymerizes at a temperature lower than the reaction temperature, as for example, paraldehyde or any substance suitable to form acetaldehyde.

In order to further illustrate the present invention and the advantages thereof, the following specific examples are given, it being understood that the same are merely intended as illustrative and not limitative.

EXAMPLE 1

Commercial silica-magnesia for fluidized bed, SM–30 type supplied by Grace & Co., Davison Chem. Div., having 28% content by weight of MgO, was impregnated with a 4.36% by weight aqueous solution of $CdCl_2 \cdot 2½H_2O$ and, after oven drying at 110° C. was further impregnated with a 1.46% by weight solution of ammonium fluoride. This catalyst was then dried and muffle activated at 400° C. for 3 hours. After such a treatment the catalyst had a cadmium fluoride content of 5% by weight.

13.34 gr. of the catalyst, prepared as above specified, were fed into a fluidized bed reactor, inside diameter 22 mm. and electrically heated. 0.0907 moles/h. of ammonia and 0.1134 moles/h. acetaldehyde were subsequently added over the course of one hour, together with some nitrogen (2–3% by weight of the reagents). The reaction temperature was 370° C. and the linear flow speed of the reacting gases was 0.87 cm./sec. 4.98 gr. of reaction products were gathered by condensation. They were at first treated with a 50% aqueous solution of sodium hydroxide and subsequently they were separated into an oily phase and an aqueous phase. The available pyridic bases were extracted from aqueous phase, which had been treated with sodium hydroxide through extraction by means of isopropyl ether, the ether extracts being united to the oily phase. The group of oil phase and etheral extracts was furtherly treated with sodium hydroxide. After elimination of the new aqueous phase obtained through the last treatment and after distillation of most of the isopropyl ether, the remaining product was submitted to gaschromatography analysis.

The ascertained yields calculated as percent moles with respect to the fed acetaldehyde, were: 33.5% alpha-picoline, 15.3% gamma-picoline. The ratio between alpha and gamma-picoline was 2.19.

To total yield of further pyridic bases—as 2-methyl-5-ethylpyridine, 3-ethylpyridine, 2,5-diethylpyridine, 2,6-dimethyl-3-ethylpyridine, was 4.1%.

EXAMPLE 2

Ammonia and acetaldehyde with a 0.8 molar ratio, were flowed for 1 hour—at 430° C. and with a total velocity equal to $1.54 \times 10^{-2}$ moles/h./gr. of catalyst—on the catalyst specified in the preceding example, consisting of SM–30 type silica-magnesia containing 5% by weight of cadium fluoride.

The yields—calculated as percent moles with respect to the fed acetaldehyde—were: 25.4% alpha-picoline and 14.7% gamma-picoline. The ratio between alpha and gamma-picoline was 1.73.

The total yield of obtained 2-methyl-5-ethylpyridine, 3-ethylpyridine, 2,5-diethylpyridine and 2,6-dimethyl-3-ethylpyridine was 2.1%.

EXAMPLES 3 AND 4

SM–30 silica-magnesia having a 10% content by weight of cadmium fluoride was prepared by impregnation with an 8.34% by weight aqueous solution of $CdCl \cdot 2½H_2O$, drying at 110° C. and further impregnation with a 2.87% by weight aqueous solution of ammonium fluoride. The catalyst was again dried at 110° C. and muffle activated for 3 hours at 400° C. Two consecutive tests at 340° C. and 370° C. respectively were performed on 13.40 gr. of said catalyst. The reaction conditions and yields are set forth in Table 1.

TABLE 1

| Reaction conditions | Example 3 | Example 4 |
|---|---|---|
| Temperature, ° C | 340 | 370 |
| Acetaldehyde plus ammonia fed-in, moles/h./gr. of catalyst | $0.78 \times 10^{-2}$ | $0.81 \times 10^{-2}$ |
| Ammonia:acetaldehyde molar ratio | 0.80 | 0.73 |
| Time required for test, hours | 2 | 2 |
| Percent molar yield referred to the fed-in acetaldehyde: | | |
| Alpha-picoline | 35.4 | 35.2 |
| Gamma-picoline | 14.9 | 18.0 |
| 2-methyl-5-ethylpyridine plus 3-ethylpyridine plus 2,5-diethylpyridine plus 2,6-dimethyl-3-ethylpyridine | 4.9 | 3.4 |
| Alpha-picoline:gamma-picoline ratio | 2.47 | 1.96 |

The acetaldehyde conversion evidenced by Example 4 was 95.4%.

EXAMPLES 5 AND 6

SM–30 silica-megnasia was impregnated with a 2.2% by weight aqueous solution of $CdCl_2 \cdot 2½H_2O$, then dried at 110° C. and again impregnated with a 0.72% by weight aqueous solution of ammonium fluoride. This acatlyst was catalyst was subsequently dried and muffle activated at 400° C. for 3 hours: its content of cadmium fluoride was 2%.

Two consecutive tests were carried out at 370° C. and 430° C. respectively on 11.82 gr. of such a catalyst.

Table 2 sets forth the reaction conditions and the yields attained.

TABLE 2

| Reaction conditions | Example 5 | Example 6 |
|---|---|---|
| Temperature, ° C | 370 | 430 |
| Acetaldehyde plus ammonia fed-in, moles/h./gr. of catalyst | $1.8 \times 10^{-2}$ | $3.35 \times 10^{-2}$ |
| Ammonia-acetaldehyde molar ratio | 0.73 | 0.87 |
| Time required for the test, minutes | 60 | 40 |
| Percent yield referred to the fed-in acetaldehyde: | | |
| Alpha-picoline | 30.0 | 28.9 |
| Gamma-picoline | 13.7 | 15.7 |
| Pyridine | 0.8 | 0.7 |
| 2-methyl-5-ethylpyridine plus 3-ethylpyridine plus 2,5-diethylpyridine plus 2,6-dimethyl-3-ethylpyridine | 5.2 | 3.0 |
| Alpha-picoline:gamma-picoline ratio | 2.19 | 1.84 |

The acetaldehyde conversion in Example 5 was 91.9%.

EXAMPLE 7

SM–30 silica-magnesia having 20% by weight of cadmium fluoride was prepared by impregnation with a 15.41% by weight aqueous solution of $CdCl_2 \cdot 2½H_2O$, drying at 110° C. and further impregnated with a 5.57% by weight aqueous solution of ammonium fluoride. Ammonia and acetaldehyde in molar ratio equal to 0.80 were flowed on 15.0 gr. of the catalyst previously activated at 400° C. for 3 hours, at a total flow speed of $0.69 \times 10^{-2}$ moles/h./gr. of catalyst.

The temperature was 370° C. and the time required for the test was 2 hours. The conversion of the acetaldehyde was 79.8% and the yield in percent moles referred to the fed acetaldehyde were: 35.9% alpha-picoline, 17.7% gamma-picoline, 2.8% 2-methyl-5-ethylpridine+3-ethylpyridine+2,5 - diethylpyridine+2,6-dimethyl - 3 - ethylpyridine.

The alpha-picoline:gamma-picoline ratio was 2.03.

EXAMPLES 8 AND 9

Cadmium hydroxide was precipitated from an aqueous solution of 3.6 gr. of tetrahydrate cadmium nitrate, by means of sodium hydroxide. Said cadmium hydroxide was filtered, washed until the $NO_3^-$ ions disappeared from the washing waters and finally dissolved in concentrated ammonia.

28.5 gr. SM–30 silica-magnesia were repeatedly impregnated with the ammonia solution of cadmium hydroxide while a drying operation at 110° C. followed each impregnation. The final catalyst, after muffle activation at 400° C. for 3 hours, contained 5% by weight of cadmium oxide.

Two consecutive tests of one hour were carried out at a temperature of 340° C. and 370° C. respectively, on 12.34 gr. of said catalyst, while ammonia and acetaldehyde were fed in a molar ratio of 0.82 at a total velocity of $1.64 \times 10^{-2}$ moles/h./gr. of catalyst. Table 3 sets forth the reaction conditions and yields.

TABLE 3

| Reaction conditions | Example 8 | Example 9 |
|---|---|---|
| Temperature, ° C | 340 | 370 |
| Acetaldehyde conversion, percent | 87 | 88 |
| Percent molar yield referred to the fed-in acetaldehyde: | | |
| Alpha-picoline | 28.7 | 30.5 |
| Gamma-picoline | 9.6 | 12.3 |
| Pyridine | 0.5 | 0.5 |
| 2-methyl-5-ethylpyridine plus 3-ethylpyridine plus 2,5-diethylpyridine plus 2,6-dimethyl-3-ethylpyridine | 5.3 | 4.1 |
| Alpha-picoline/gamma-picoline ratio | 2.99 | 2.48 |

EXAMPLES 10 AND 11

SM–30 silica-magnesia was impregnated with an aqueous solution having 3.81% by weight of zinc chloride, then dried at 110° C. and finally impregnated with an aqueous solution having 2.11% by weight of ammonium fluoride.

The resulting catalyst—after drying at 110° C. and activation at 400° C. for three hours—showed a 5% zinc fluoride content.

Two consecutive tests, each for the duration of 40 minutes, were carried out on 13.32 gr. of said catalyst by letting ammonia and acetaldehyde flow thereon in molar ratio 0.87, at 370° C. and 430° C. respectively.

Table 4 sets forth the reaction conditions and yields.

TABLE 4

| Reaction conditions | Example 10 | Example 11 |
|---|---|---|
| Temperature, ° C | 370 | 430 |
| Acetaldehyde plus ammonia fed-in, moles/ h./gr. of catalyst | $2.95 \times 10^{-2}$ | $2.97 \times 10^{-2}$ |
| Percent molar yield referred to the fed-in acetaldehyde: | | |
| Alpha-picoline | 26.1 | 28.9 |
| Gamma-picoline | 14.5 | 18.1 |
| 2-methyl-5-ethylpyridine plus 3-ethylpyridine plus 2,5-diethylpyridine plus 2,6-dimethyl-3-ethyl-pyridine | 7.9 | 4.1 |
| Alpha-picoline/gamma-picoline ratio | 1.80 | 1.60 |

EXAMPLE 12

SM–30 silica-magnesia was impregnated with a 4.85% by weight aqueous solution of trihydrate lead acetate. After drying at 110° C. and muffle activation at 400° C. for 3 hours, the catalyst showed a 5% content by weight of PbO.

A 40 minute long test was carried out at 370° C. on 11.55 gr. of said catalyst by feeding ammonia and acetaldehyde in a molar ratio of 0.9, with a total flow speed of $3.35 \times 10^{-2}$ moles/h./gr. of catalyst.

The yields achieved—stated as moles percent referred to the fed-in acetaldehyde—were: 26.6% alpha-picoline, 12.5% gamma-picoline, 5.3% 2-methyl-5-ethylpyridine+ 3-ethylpyridine+2,5 - diethylpyridine+2,6 - dimethyl-3-ethylpyridine.

The alpha-picoline: gamma-picoline ratio was 2.13.

EXAMPLES 13 AND 14

12.46 gr. SM–30 silica-magnesia with a MgO content of 28% by weight and a pores volume of 0.67 cc./gr. were introduced into a fluidized bed reactor. Ammonia and acetaldehyde were then fed in a molar ratio of 0.82. Two consecutive tests each of one hour were carried out at 370° C. and 430° C. respectively.

Table 5 sets forth the reaction conditions and yields.

TABLE 5

| Reaction conditions | Example 13 | Example 14 |
|---|---|---|
| Temperature, ° C | 370 | 430 |
| Acetaldehyde plus ammonia fed-in, moles/ h./gr. of catalyst | $1.65 \times 10^{-2}$ | $1.61 \times 10^{-2}$ |
| Percent molar yield referred to the fed-in acetaldehyde: | | |
| Alpha-picoline | 17.9 | 16.6 |
| Gamma-picoline | 11.0 | 13.0 |
| Pyridine | 0.2 | 1.4 |
| 2-methyl-5-ethylpryidine plus 3-ethylpyridine plus 2,5-diethylpryidine plus 2,6-dimethyl-3-ethylpyridine | 8.5 | 5.0 |
| Alpha-picoline/gamma-picoline ratio | 1.63 | 1.28 |

EXAMPLES 15 AND 16

A catalyst consisting of silica-alumina containing 5% by weight of zinc fluoride was produced starting from commercial microspheroidal silica-alumina with 13% by weight of alumina.

To this aim 28.5 gr. of silica-alumina were impregnated by 50 cc. of a 3.8% by weight aqueous solution of zinc chloride, oven dried at 105° C. and again impregnated with 50 cc. of a 2.11% by weight aqueous solution of ammonia fluoride.

This catalyst was then dried and activated at 400° C. for three hours.

10.12 gr. of the produced catalyst were introduced into a fluidized bed reactor. Ammonia and acetaldehyde were fed in a molar ratio of 0.83 for carrying out two consecutive tests at 370° C. and 430° C. respectively.

Table 6 sets forth the reaction conditions and yields.

TABLE 6

| Reaction conditions | Example 15 | Example 16 |
|---|---|---|
| Temperature, ° C | 370 | 430 |
| Time required for the test, minutes | 60 | 40 |
| Acetaldehydr plus ammonia fed-in, moles/ h./gr. of catalyst | $1.98 \times 10^{-2}$ | $3.93 \times 10^{-2}$ |
| Percent molar yield referred to the fed-in acetaldehyde: | | |
| Alpha-picoline | 19.7 | 23.6 |
| Gamma-picoline | 15.6 | 21.8 |
| Pyridine | 0.4 | 1.0 |
| 2-methyl-5-ethylpryidine plus 3-ethyl pyridine plus 2,5-diethylpyridine plus 2,6-dimethyl-3-ethylpyridine | 4.6 | 5.0 |
| Alpha-picoline/gamma-picoline ratio | 1.26 | 1.09 |

EXAMPLE 17

Microspheroidal silica-alumina having an alumina content of 13% by weight, was impregnated with a 4.85% by weight aqueous solution of trihydrate lead acetate.

This catalyst was dried at 110° C. and muffle activated at 400° C. for three hours; after said treatment is contained 5% by weight of PbO.

A test of one hour was carried out with 8.53 gr. of said catalyst, at 370° C. while ammonia and acetaldehyde were fed in molar ratio 0.83 and at a total flow speed of $2.37 \times 10^{-2}$ moles/h./gr. of catalyst.

The yields—stated as percent moles referred to the fed acetaldehyde—were: 16.3% alpha-picoline, 16.0% gamma-picoline, 0.4% pyridine, 4.2% 2-methyl-5-ethylpyridine+3-ethylpyridine+2,5 - diethylpyridine+2,6-dimethyl-3-ethylpyridine.

The alpha-picoline/gamma-picoline ratio was 1.02.

EXAMPLE 18

8.3 gr. of microspheroidal silica-alumina having an alumina content equal to 13% and a pores volume 0.71 cc./gr., were introduced into a fluidized bed reactor. Ammonia and acetaldehyde in molar ratio 0.83 were subsequently fed therein.

The time required for the test was ½ hour and the temperature was 400° C. The total flow speed of both reagents was $4.9 \times 10^{-2}$ moles/h./gr. of catalyst.

The yields—stated as percent moles referred to the fed acetaldehyde—were: 16.0% alpha-picoline, 23.3% gamma-picoline, 1.0% pyridine, 4.8% 2-methyl-5-ethylpyridine+3 - ethylpyridine+2,5-diethyl-pyridine+2,6-dimethyl-3-ethylpyridine.

The alpha-picoline/gamma-picoline ratio was 0.68.

As many apparently widely different embodiments of this invention may be made without departing from the spirit and scope thereof, it is to be understood that the same is not to be limited to the specific embodiments thereof, except as defined by the appended claims.

What is claimed is:

1. A process for the preparation of mixtures of alpha-picoline and gamma-picoline which comprises reacting ammonia and an aldehyde selected from the group consisting of acetaldehyde and paraldehyde in the vapor phase at a temperature of from 200° C. to 650° C. in the presence of
    (a) a catalyst consisting essentially of a mixture of silica and magnesia; and
    (b) a cadmium fluoride co-catalyst the amount of the magnesia of said catalyst being from 10% to 60% by weight.

2. The process as defined by claim 1, wherein the molar ratio of acetaldehyde to ammonia ranges from between 1:0.33 and 1:5.

3. The process as defined by claim 2, wherein the said molar ratio ranges from between 1:0.5 and 1:3.

4. The process as defined by claim 1, wherein said temperature is from 300° C. to 550° C.

5. The process as defined by claim 1, wherein the amount of magnesia in said catalyst ranges from between 20 percent and 35 percent by weight.

6. The process as defined by claim 1, wherein said aldehyde is acetaldehyde.

References Cited

UNITED STATES PATENTS 3,284,456  11/1966  Shimizu et al. _____ 260—290

FOREIGN PATENTS 742,643  1955  England _____ 260—290
900,799  1962  England _____ 260—290

JOHN D. RANDOLPH, Primary Examiner

H. I. MOATZ, Assistant Examiner